(12) United States Patent
Kobayashi et al.

(10) Patent No.: US 10,423,946 B2
(45) Date of Patent: Sep. 24, 2019

(54) POS TERMINAL DEVICE, COMMODITY RECOGNITION METHOD, AND NON-TRANSITORY COMPUTER READABLE MEDIUM STORING PROGRAM

(71) Applicant: NEC Corporation, Tokyo (JP)

(72) Inventors: Jun Kobayashi, Tokyo (JP); Eiji Muramatsu, Tokyo (JP); Kota Iwamoto, Tokyo (JP); Soma Shiraishi, Tokyo (JP); Tetsuo Inoshita, Tokyo (JP)

(73) Assignee: NEC Corporation, Tokyo (JP)

( * ) Notice: Subject to any disclaimer, the term of this patent is extended or adjusted under 35 U.S.C. 154(b) by 407 days.

(21) Appl. No.: 15/035,511

(22) PCT Filed: Nov. 11, 2014

(86) PCT No.: PCT/JP2014/005660
§ 371 (c)(1),
(2) Date: May 10, 2016

(87) PCT Pub. No.: WO2015/068404
PCT Pub. Date: May 14, 2015

(65) Prior Publication Data
US 2016/0292662 A1 Oct. 6, 2016

(30) Foreign Application Priority Data

Nov. 11, 2013 (JP) ................................ 2013-233132

(51) Int. Cl.
*G06Q 20/20* (2012.01)
*G07G 1/00* (2006.01)
(Continued)

(52) U.S. Cl.
CPC ............. *G06Q 20/208* (2013.01); *G03B 7/08* (2013.01); *G03B 15/05* (2013.01); *G03B 17/53* (2013.01);
(Continued)

(58) Field of Classification Search
CPC ........... G03B 7/08; G03B 15/05; G03B 17/53
(Continued)

(56) References Cited

U.S. PATENT DOCUMENTS 6,081,254 A * 6/2000 Tanaka ..................... G09G 5/02
345/207
8,990,140 B2 * 3/2015 Michelstein .......... G06F 17/211
705/1.1
(Continued)

FOREIGN PATENT DOCUMENTS

JP 2006-259829 9/2006
JP 2011-2416 1/2011
(Continued)

OTHER PUBLICATIONS

International Search Report dated Feb. 10, 2015, in corresponding PCT International Application.

*Primary Examiner* — Vanel Frenel
(74) *Attorney, Agent, or Firm* — Finnegan, Henderson, Farabow, Garrett & Dunner, L.L.P.

(57) ABSTRACT

A POS terminal device capable of improving a recognition rate in a process for recognizing a commodity irrespective of the surrounding environment is provided. A POS terminal device (1) includes a brightness measurement unit (2), an irradiation unit (4), an image pickup unit (6), and a recognition process unit (8). The brightness measurement unit (2) measures the brightness of environmental light around the POS terminal device (1). The irradiation unit (4) irradiates a commodity with light, the light being adjusted according to
(Continued)

the brightness of the environmental light measured by the brightness measurement unit (2). The image pickup unit (6) shoots the commodity irradiated with the light by the irradiation unit (4) and thereby generates an image thereof. The recognition process unit (8) performs a process for recognizing the commodity based on the image generated by the shooting performed by the image-pickup unit (6).

13 Claims, 7 Drawing Sheets

(51) Int. Cl.
  *G07G 1/12* (2006.01)
  *G06K 9/20* (2006.01)
  *H04N 5/225* (2006.01)
  *H04N 5/235* (2006.01)
  *G03B 7/08* (2014.01)
  *G03B 15/05* (2006.01)
  *G03B 17/53* (2006.01)
  *G06K 9/00* (2006.01)
  *H04N 9/73* (2006.01)

(52) U.S. Cl.
  CPC ......... *G06K 9/00201* (2013.01); *G06K 9/209* (2013.01); *G06K 9/2018* (2013.01); *G06K 9/2027* (2013.01); *G06K 9/2036* (2013.01); *G07G 1/0036* (2013.01); *G07G 1/12* (2013.01); *H04N 5/2256* (2013.01); *H04N 5/2354* (2013.01); *G06K 2209/17* (2013.01); *H04N 5/2351* (2013.01); *H04N 9/735* (2013.01)

(58) Field of Classification Search
  USPC ............ 705/23, 21, 16; 348/223.1; 382/167; 358/1.9; 235/462.41
  See application file for complete search history.

(56) References Cited

U.S. PATENT DOCUMENTS

| | | | | |
|---|---|---|---|---|
| 2009/0157478 | A1* | 6/2009 | Yang | G06Q 30/02 705/7.29 |
| 2010/0246904 | A1* | 9/2010 | Yamashita | G06K 9/00255 382/118 |
| 2011/0169721 | A1* | 7/2011 | Bauer | G10L 21/0208 345/84 |
| 2012/0163716 | A1* | 6/2012 | Kishimoto | H04N 1/6027 382/167 |
| 2013/0132292 | A1* | 5/2013 | Lamb | G06Q 30/018 705/318 |
| 2013/0223682 | A1* | 8/2013 | Sugasawa | G06K 9/3241 382/103 |
| 2013/0242361 | A1* | 9/2013 | Matsumoto | H04N 1/6044 358/504 |
| 2015/0356666 | A1* | 12/2015 | Pas | G06Q 30/0639 705/26.9 |
| 2017/0263011 | A1* | 9/2017 | Yalniz | G06K 9/6201 |

FOREIGN PATENT DOCUMENTS

| | | |
|---|---|---|
| JP | 2012-173901 | 9/2012 |
| JP | 2012-216138 | 11/2012 |
| JP | 2013-182326 | 9/2013 |
| WO | WO 2007/135735 A1 | 11/2007 |

\* cited by examiner

POS TERMINAL DEVICE, COMMODITY RECOGNITION METHOD, AND NON-TRANSITORY COMPUTER READABLE MEDIUM STORING PROGRAM

CROSS-REFERENCE TO RELATED PATENT APPLICATIONS

This application is a National Stage Entry of International Application No. PCT/JP2014/005660, filed Nov. 11, 2014, which claims priority from JP 2013-233132, filed Nov. 11, 2013. The entire contents of the above-referenced applications are expressly incorporated herein by reference.

TECHNICAL FIELD

The present invention relates to a POS (Point Of Sales) terminal device, a commodity recognition method, and a non-transitory computer readable medium storing a program. In particular, the present invention relates to a POS terminal device, a commodity recognition method, and a non-transitory computer readable medium storing a program used to make a settlement (or payment) for a commodity.

BACKGROUND ART

In POS (Point Of Sales) terminals installed in settlement places (checkout counters: cash registers) of supermarkets, mass merchandising stores, and the like, a salesclerk enters data of commodities with barcodes attached thereto by using a barcode input device and enters data of commodities to which barcodes cannot be attached by using a keyboard. Therefore, the time necessary for entering data of commodities with no barcodes attached thereto widely changes depending on the level of the skill of the salesclerk. In some cases, a salesclerk attaches store-original barcodes to commodities with no barcodes attached thereto in advance. However, such a task leads to an increase in working hours. Meanwhile, recently, self-checkout counters in which a customer operates a POS terminal device by himself/herself have been increasing. Since it takes time for a customer to find where a barcode is attached to a commodity, the time necessary for operating the POS terminal device further increases.

Therefore, a technique for taking an image (i.e., a picture) of a commodity by using a camera or the like disposed inside a POS terminal device and recognizing the commodity by using an image recognition technique has been proposed. For example, Patent Literature 1 discloses an apparatus that captures a frame image including an image of an object taken by image pickup means and performs an object recognition process by using the captured frame image. The apparatus disclosed in Patent Literature 1 captures a frame image including an image of an object taken by the image pickup means, and lowers a reference value when a color attribute of the captured frame image does not exceed the reference value and performs the object recognition process when the color attribute of the captured frame image exceeds the reference value.

CITATION LIST

Patent Literature

Patent Literature 1: Japanese Unexamined Patent Application Publication No. 2013-182326

SUMMARY OF INVENTION

Technical Problem

When a process for recognizing a commodity is performed by using an image recognition technique, color information of the commodity is an important element for the commodity recognition process. In particular, commodities such as fruits and vegetables are distinguished based on their color differences. Therefore, if such commodities are not appropriately shot (i.e., photographed (hereinafter simply expressed as "shot")) so that their color information is properly obtained, erroneous recognition could occur. However, there are cases where the color of the commodity changes due to light from the surrounding environment (environmental light) when the commodity is shot by a camera and thus the commodity with the changed color is shot.

For example, in an environment where evening sunlight comes into a store, commodities are illuminated by the evening sunlight and hence the commodities with reddish colors are shot. Further, the colors of shot commodities could change due to illumination such as fluorescent lights disposed in a store. In such cases, the correct color information of commodities cannot be used for the commodity recognition process. Therefore, there is a possibility that the commodity may be erroneously recognized and the commodity recognition rate deteriorates.

In Patent Literature 1, control is performed so that the reference value for the color attribute is changed. In such cases, when there are a darker part and a lighter part in the color of commodities, there is a possibility that a commodity may be erroneously recognized in the commodity recognition process. Further, when a camera having a white-balance function is used, there are cases where the camera performs a white-balance process in an environment into which evening sunlight comes. However, in this case, since the color correction is performed on the camera side, the correct color information of commodities cannot be used. Note that there is a method in which environmental light is physically blocked, for example, by covering a commodity reading surface of a POS terminal device with a cover or the like in front thereof so that commodities are not illuminated by the environmental light. However, in such a method, the cover could interfere with the operation for reading commodities and hence the usability deteriorates.

The present invention has been made to solve the above-described problem and provide a POS terminal device, a commodity recognition method, and a non-transitory computer readable medium storing a program capable of improving a recognition rate in a process for recognizing a commodity irrespective of the surrounding environment.

Solution to Problem

A POS terminal device according to the present invention includes: brightness measurement means for measuring brightness of environmental light; irradiation means for irradiating a commodity with light, the light being adjusted according to the brightness of the environmental light measured by the brightness measurement means; image-pickup means for shooting (i.e., photographing (hereinafter simply expressed as "shooting")) the commodity irradiated with the light by the irradiation means and thereby generating an image thereof; and recognition process means for performing a process for recognizing the commodity based on the image generated by the shooting performed by the image-pickup means.

Further, a method for recognizing a commodity according to the present invention includes: measuring a brightness of environmental light; irradiating a commodity with light, the light being adjusted according to the measured brightness of the environmental light; shooting the commodity irradiated with the light and thereby generating an image thereof; and performing a process for recognizing the commodity based on the image generated by the shooting.

Further, a program according to the present invention causes a computer to execute: a step of measuring a brightness of environmental light; a step of irradiating a commodity with light, the light being adjusted according to the measured brightness of the environmental light; a step of shooting the commodity irradiated with the light and thereby generating an image thereof; and a step of performing a process for recognizing the commodity based on the image generated by the shooting.

Advantageous Effects of Invention

According to the present invention, it is possible to provide a POS terminal device, a commodity recognition method, and a non-transitory computer readable medium storing a program capable of improving a recognition rate in a process for recognizing a commodity irrespective of the surrounding environment.

DESCRIPTION OF EMBODIMENTS (Outline of Exemplary Embodiment According to the Present Invention)

Figure 1:
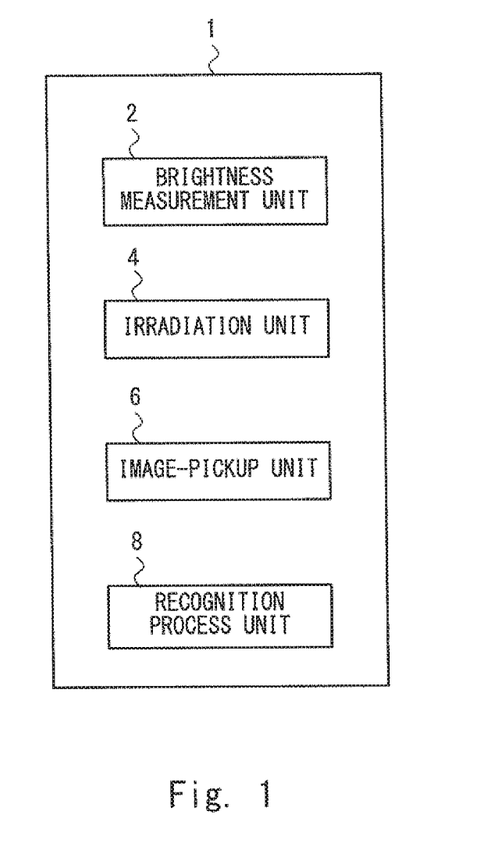
FIG. 1 shows an outline of a POS terminal device according to an exemplary embodiment of the present invention.

Prior to giving an explanation of exemplary embodiments according to the present invention, an outline of an exemplary embodiment thereof is explained. FIG. 1 shows an outline of a POS terminal device 1 according to an exemplary embodiment of the present invention. As shown in FIG. 1, the POS terminal device 1 includes a brightness measurement unit 2, an irradiation unit 4, an image-pickup unit 6, and a recognition process unit 8.

The brightness measurement unit 2 measures the brightness of environmental light around the POS terminal device 1. The irradiation unit 4 irradiates a commodity with light that is adjusted according to the brightness of the environmental light measured by the brightness measurement unit 2. The image-pickup unit 6 shoots (i.e., photographs (hereinafter simply expressed as "shoots")) the commodity irradiated with the light by the irradiation unit 4 and thereby generates an image of the commodity. The recognition process unit 8 performs a process for recognizing the commodity based on the image generated by the shooting performed by the image-pickup unit 6. With the above-described configuration, the POS terminal device 1 according to an exemplary embodiment of the present invention can improve a recognition rate in a process for recognizing a commodity irrespective of the surrounding environment.

(First Exemplary Embodiment)

Figure 2:
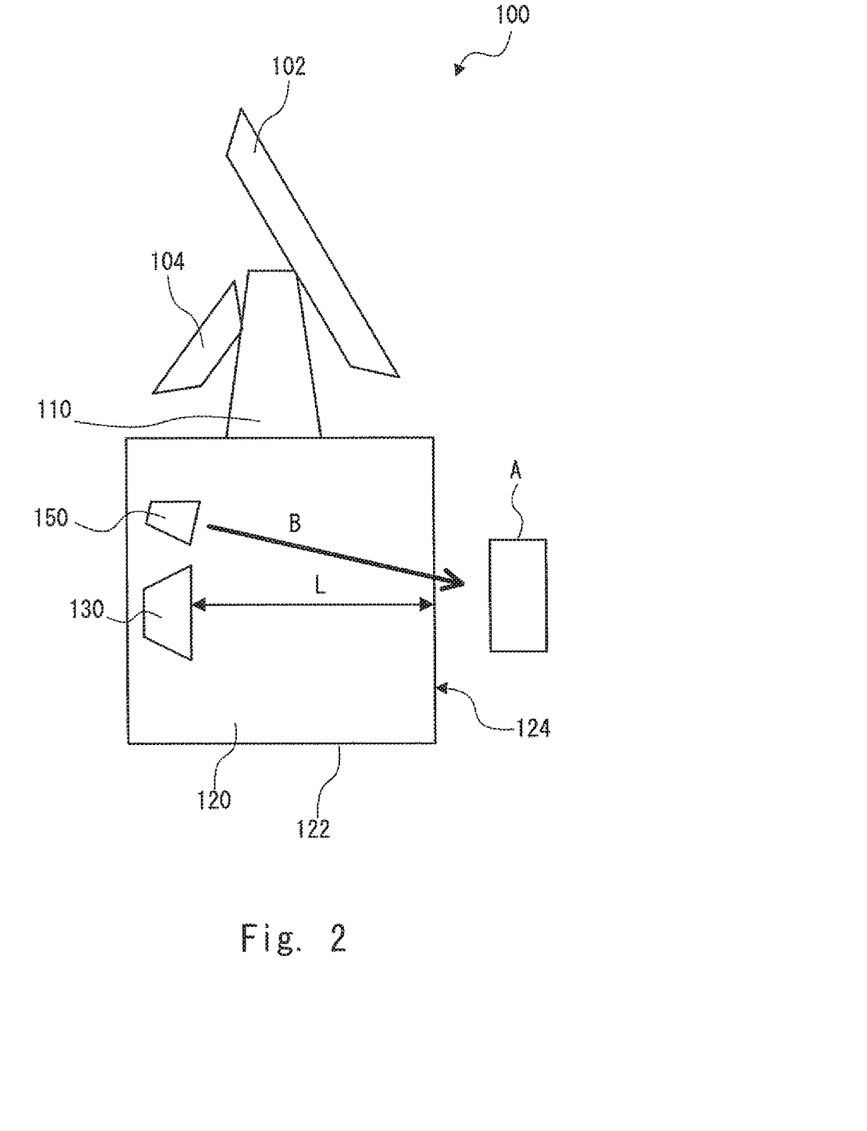
FIG. 2 is a side view showing an external appearance of a POS terminal device according to a first exemplary embodiment.
Figure 3:
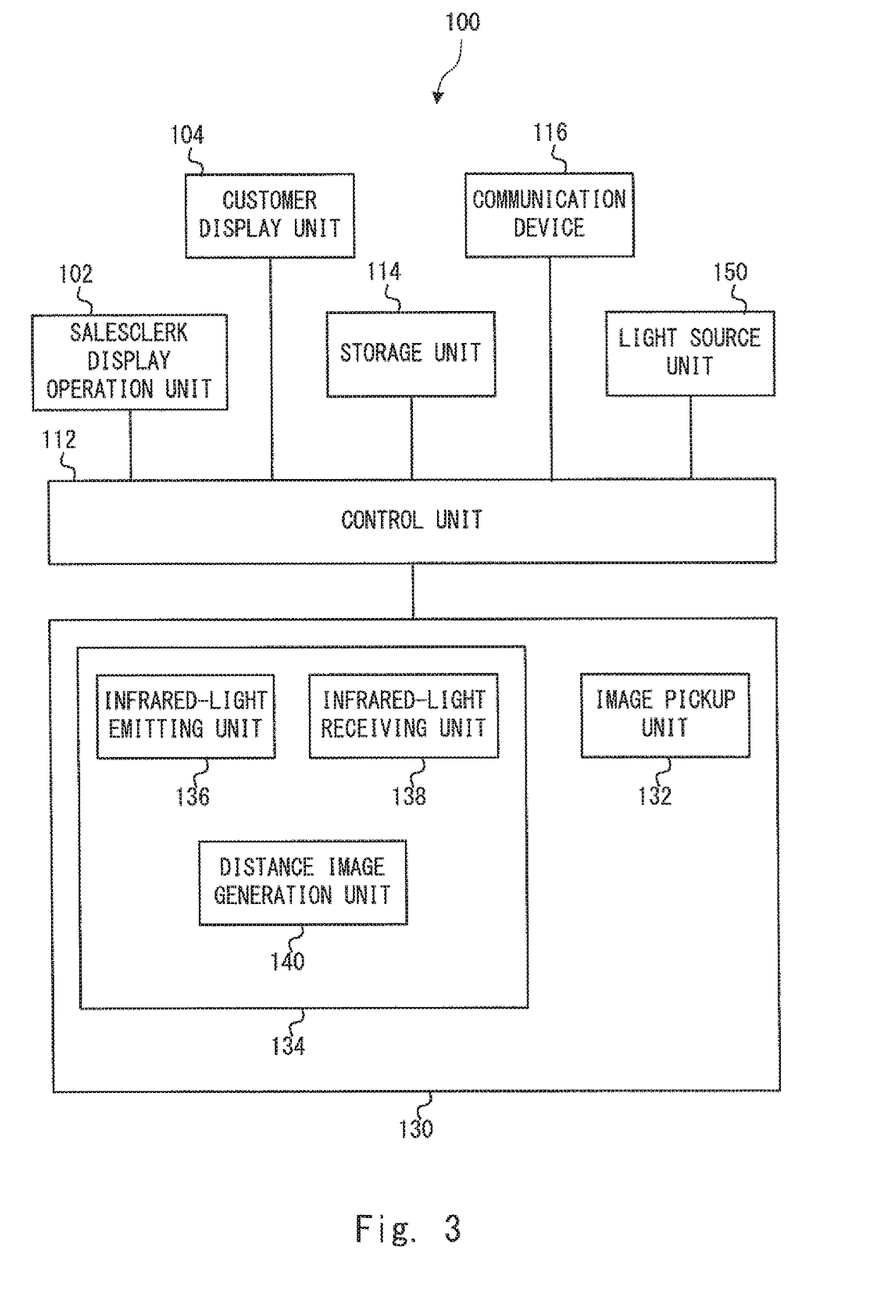
FIG. 3 shows a hardware configuration of the POS terminal device according to the first exemplary embodiment.

Exemplary embodiments according to the present invention are explained hereinafter with reference to the drawings. FIG. 2 is a side view showing an external appearance of a POS terminal device 100 according to a first exemplary embodiment. Further, FIG. 3 shows a hardware configuration of the POS terminal device 100 according to the first exemplary embodiment. The POS terminal device 100 includes a salesclerk display operation unit 102, a customer display unit 104, an information processing device 110, a commodity reading device 120, and a light source unit 150 (irradiation means). The POS terminal device 100 is placed on, for example, a counter (not shown). Further, a customer and a salesclerk stand on the left and right sides, respectively, of the POS terminal device 100 in FIG. 2, and they face each other with the POS terminal device 100 interposed therebetween.

The salesclerk display operation unit 102 is, for example, a touch panel, an LCD (Liquid Crystal Display), a keyboard, or the like. The salesclerk display operation unit 102 displays information necessary for the salesclerk under the control of the information processing device 110 and receives an operation performed by the salesclerk.

The customer display unit 104 is, for example, a touch panel, an LCD, or the like. The customer display unit 104 displays information necessary for the customer under the control of the information processing device 110. Further, the customer display unit 104 may include an input device and receive an operation performed by the customer as required.

The information processing device 110 is, for example, a computer. The information processing device 110 includes, for example, a control unit 112 such as a CPU (Central Processing Unit), a storage unit 114 such as a memory or a hard disk, and a communication device 116. The information processing device 110 controls the operations of the salesclerk display operation unit 102, the customer display unit 104, the commodity reading device 120, and the light source unit 150. Further, the information processing device 110 performs a necessary process according to an operation received by the salesclerk display operation unit 102. Further, the information processing device 110 performs a necessary process such as an image process and a recognition process according to image information read by the commodity reading device 120. The communication device 116 performs a process necessary for performing communication with a management device, such as a server, connected to the communication device 116 through a network.

The commodity reading device 120 includes a housing 122, a commodity reading surface 124 formed of optically-transparent material, and a 3D (three-dimensional) camera 130. The commodity reading surface 124 is disposed on the salesclerk side of the housing 122 and a commodity is pointed toward the commodity reading surface 124 when the commodity is shot (read). The 3D camera 130 is disposed inside the housing 122 and disposed on the opposite side to the commodity reading surface 124. When the salesclerk points a commodity, which is received from the customer, toward the commodity reading surface 124, the 3D camera 130 reads (i.e., takes) an image of the commodity A. In this way, the POS terminal device 100 performs a process for recognizing the commodity. Details of the recognition process are described later.

The 3D camera 130 includes an image pickup unit 132 and a distance sensor 134 (distance measurement means). The image pickup unit 132 is, for example, an image pickup device (camera) such as a CCD (Charge-Coupled Device) and performs a process for reading (i.e., taking) an image of a commodity. Specifically, the image pickup unit 132 shoots an object pointed toward the commodity reading surface 124 and generates a two-dimensional (2D) color or monochrome image (2D image) including an image of the object. Note that the term "2D image" also means "image data representing a 2D image" to be processed in information processing hereinafter.

Further, the image pickup unit 132 has a function of measuring the brightness of environmental light (external light or illumination in the room or the like) by shooting what is located in front of the commodity reading surface 124 under an environment illuminated by the environmental light. In other words, the image pickup unit 132 has, as brightness measurement means, a function of receiving light emitted in front of the commodity reading surface 124 and measuring the brightness of environmental light based on the brightness of the received light. Details of the image pickup unit 132 are described later. Note that the "brightness" means, for example, an illuminance (lux). However, it is not limited to illuminance and may be, for example, a luminance or a lightness. In this exemplary embodiment, the illuminance (lux) is used as an example of "brightness".

The distance sensor 134 is, for example, a TOF (Time Of Flight) type sensor and measures a distance from the distance sensor 134 to the position of an object (commodity A) pointed toward the commodity reading surface 124. That is, the distance sensor 134 emits a light ray such as an infrared light ray and measures the distance based on a time necessary for the light ray to travel to the object and return from the object. Note that although infrared light is emitted in this exemplary embodiment, the light ray is not limited to infrared light. For example, the distance sensor 134 may emit a laser.

The distance sensor 134 has a function as distance measurement means. The distance sensor 134 includes an infrared-light emitting unit 136, an infrared-light receiving unit 138, and a distance image generation unit 140. The infrared-light emitting unit 136 emits infrared light toward the outside of the commodity reading surface 124. When there is an object near the commodity reading surface 124, the infrared light emitted by the infrared-light emitting unit 136 is reflected on that object. The infrared-light receiving unit 138 is, for example, an image sensor (e.g., a CCD or a CMOS (Complementary Metal-Oxide Semiconductor)) and receives the infrared light reflected on the object.

The distance image generation unit 140 calculates a distance (depth) to an object based on a time difference between a time when the infrared-light emitting unit 136 emits infrared light and a time when the infrared-light receiving unit 138 receives the reflected light. Specifically, the infrared-light emitting unit 136 and the infrared-light receiving unit 138 are configured so that they are synchronized with each other. Then, the distance image generation unit 140 measures the above-described time difference by measuring a phase difference between the phase of infrared light emitted by the infrared-light emitting unit 136 and that of the reflected light received by the infrared-light receiving unit 138.

More specifically, the distance image generation unit 140 measures a distance to each of positions in an object by measuring a time difference for each of the light rays reflected at the respective positions in the object and received by the infrared-light receiving unit 138. In this way, the distance image generation unit 140 generates a distance image (3D image) consisting of a set of pixels indicating the distances to the respective positions in the object. Note that the term "distance image" also means "image data representing a distance image" to be processed in information processing hereinafter.

For example, a pixel corresponding to a position in a distance image that is 15 cm away from the distance sensor 134 includes distance information indicating a "distance of 15 cm". Further, a pixel corresponding to a position in a distance image that is 30 cm away from the distance sensor 134 includes distance information indicating a "distance of 30 cm".

Note that when a distance between the distance sensor 134 and an object is too small, the difference between the phase of emitted light and that of its reflected light cannot be detected, thus making the measurement of the time difference impossible. Consequently, the distance to the object cannot be measured. Therefore, the distance sensor 134 (3D camera 130) is disposed a distance L away from the commodity reading surface 124 so that the minimum distance between the distance sensor 134 (3D camera 130) and an object, which corresponds to the minimum time difference (phase difference) the distance sensor 134 can measure, is always maintained. That is, the distance sensor 134 (3D camera 130) is disposed the distance L away from the commodity reading surface 124 so that the minimum measurable distance is always maintained. The speed of infrared light (the light speed) is 300,000 Km/s. That is, infrared light travels 30 cm per nanosecond. In other words, when the distance between the distance sensor 134 and the object changes by 15 cm (30 cm in a round trip), the time from when light is emitted to when the reflected light is received changes by one nanosecond. Therefore, for example, when the minimum measurable time difference is one nanosecond, the distance L is 15 cm.

Further, the image pickup unit 132 and the distance sensor 134 may be arranged close to each other (i.e., disposed roughly in the same place). In such a case, the image pickup unit 132 and the distance sensor 134 are configured so that a 2D image obtained by the image pickup unit 132 and a distance image obtained by the distance sensor 134 correspond to each other (or match each other). That is, when a given position P of an object to be shot corresponds to a pixel position (X1, Y1) in the 2D image, the position P also roughly corresponds to a pixel position (X1, Y1) in the distance image. In other words, the image pickup unit 132 and the distance sensor 134 are configured so that each of pixel positions in a distance image obtained by the distance sensor 134 corresponds to a respective one of pixel positions in a 2D image obtained by the image pickup unit 132. Note that when the position of the image pickup unit 132 is somewhat displaced from the position of the distance sensor 134, a process for aligning (or matching) the position of each of pixels in the distance image with that of a respective one of pixels in the 2D image based on the distance between the image pickup unit 132 and the distance sensor 134 and the viewing angle of each of the image pickup unit 132 and the distance sensor 134 may be performed.

The light source unit 150 is a light source that irradiates a commodity A with light as indicated by an arrow B. Although the light source unit 150 is disposed inside the commodity reading device 120 in FIG. 2, the position of the light source unit 150 is not limited to this example. For example, the light source unit 150 may be disposed outside of the commodity reading surface 124 and near thereto, or may be disposed in a place away from the POS terminal device 100. FIG. 2 shows an example where the light source unit 150 is disposed near the 3D camera 130.

The light source unit 150 adjusts the intensity of light applied to the commodity A under the control of the control unit 112 of the information processing device 110. In other words, the light source unit 150 adjusts the brightness (illuminance or the like) of the commodity A under the control of the control unit 112 of the information processing device 110. Note that the "intensity of light (of the light source)" is, for example, a luminous flux (lumen). However, it is not limited to this example and may be, for example, a luminosity (candela) or a luminance. In this exemplary embodiment, the luminous flux (lumen) is used as an example of the "intensity of light (of the light source)".

Figure 4:
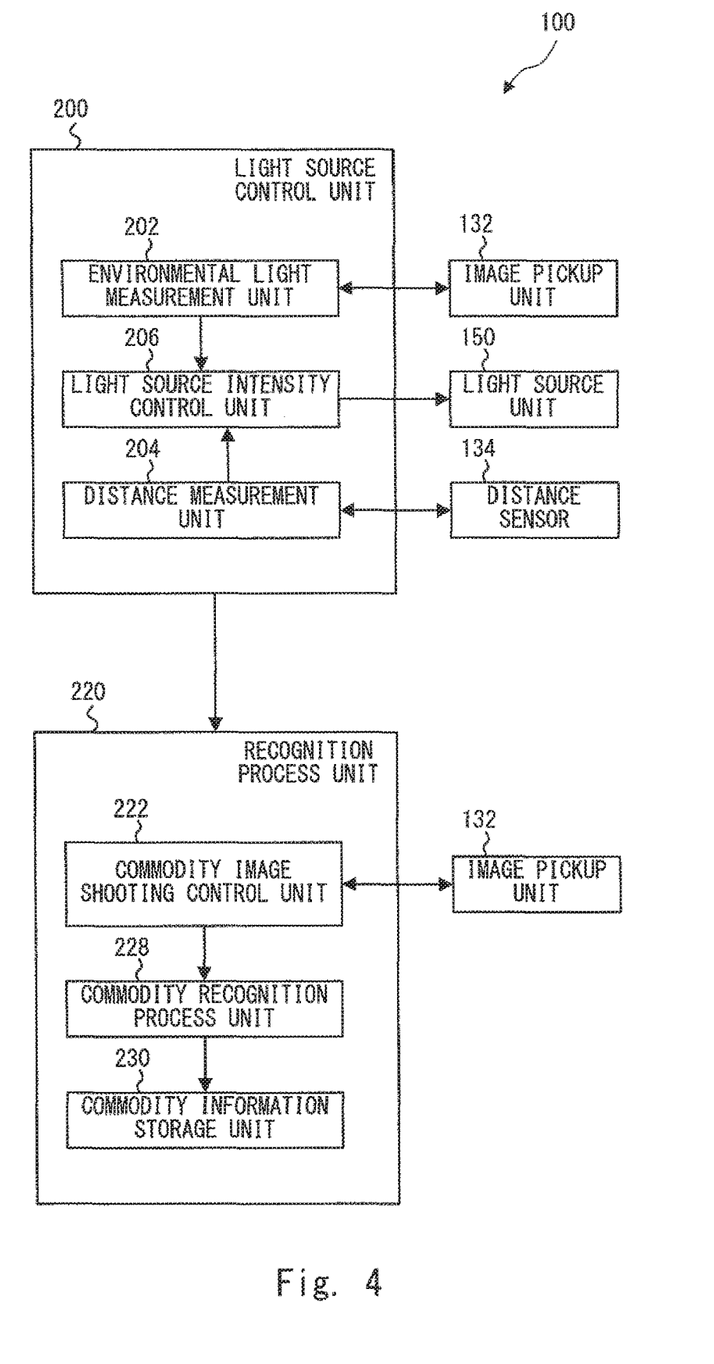
FIG. 4 is a functional block diagram of the POS terminal device according to the first exemplary embodiment.
Figure 5:
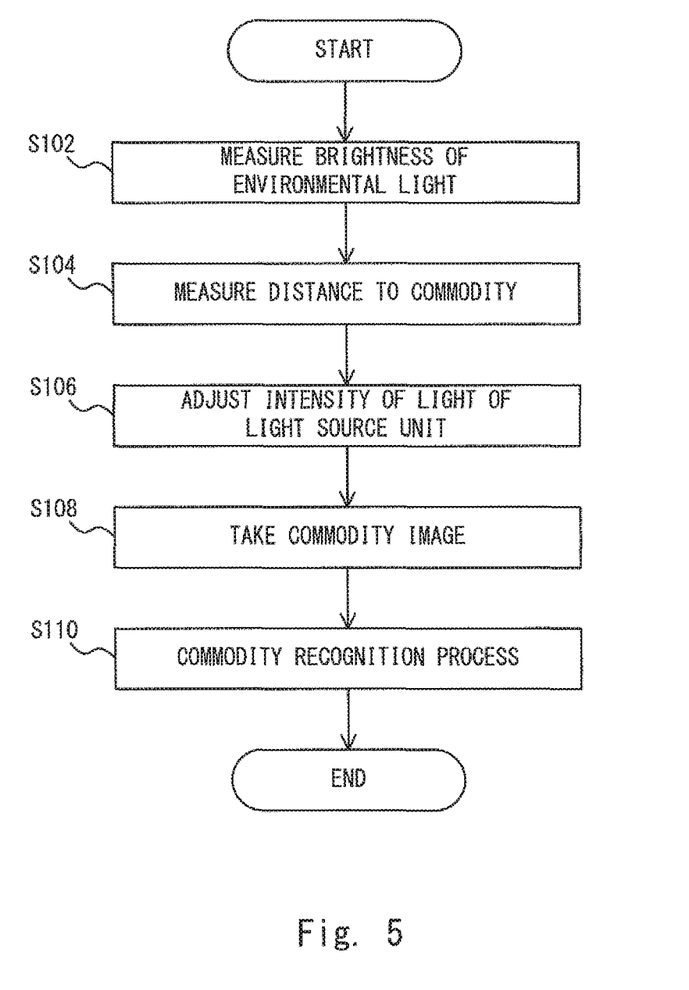
FIG. 5 is a flowchart showing a process performed by the POS terminal device according to the first exemplary embodiment.

FIG. 4 is a functional block diagram of the POS terminal device 100 according to the first exemplary embodiment. Further, FIG. 5 is a flowchart showing processes performed by the POS terminal device 100 according to the first exemplary embodiment. The POS terminal device 100 includes a light source control unit 200 and a recognition process unit 220. The light source control unit 200 includes an environmental light measurement unit 202, a distance measurement unit 204, and a light source intensity control unit 206. Further, the recognition process unit 220 includes a commodity image shooting control unit 222, a commodity recognition process unit 228, and a commodity information storage unit 230.

Note that each of the light source control unit 200 and the recognition process unit 220 can be implemented by, for example, executing a program under the control of the control unit 112. More specifically, each of the light source control unit 200 and the recognition process unit 220 can be implemented by, for example, executing a program stored in the storage unit 114 under the control of the control unit 112. Further, each component does not necessarily have to be implemented by software by using a program. That is, each component may be implemented by any combination of hardware, firmware, software, and the like. Further, each component in the light source control unit 200 and the recognition process unit 220 may be implemented by using, for example, an integrated circuit that can be programed by a user, such as an FPGA (field-programmable gate array) or a microcomputer. In such a case, a program formed from each of the above-described component may be implemented by using this integrated circuit.

The light source control unit 200 controls and adjusts the intensity of light projected by the light source unit 150 according to the brightness of the environmental light. That is, the light source unit 150 adjusts the intensity of light under the control of the light source control unit 200. The recognition process unit 220 performs a process for recognizing a commodity irradiated with light by the light source unit 150 (i.e., a commodity recognition process). That is, the light source control unit 200 may control the recognition process unit 220 so that the recognition process unit 220 performs the commodity recognition process while controlling the light source unit 150. Processes performed by the light source control unit 200 and the recognition process unit 220 are explained hereinafter in detail.

The environmental light measurement unit 202 measures the brightness of environmental light around the POS terminal device 100 (S102). That is, the environmental light measurement unit 202 has a function as brightness measurement means for measuring the brightness of environmental light. Specifically, for example, the environmental light measurement unit 202 controls the image pickup unit 132 in a state where the light source unit 150 does not emit light so that the image pickup unit 132 shoots what is located in front of the commodity reading surface 124 (e.g., shoots the top surface of the counter on which the POS terminal device 100 is placed) under an environment irradiated with environmental light. Note that in this process, the environmental light measurement unit 202 may control the light source unit 150 so that the light source unit 150 does not emit light.

The image pickup unit 132 takes an image of what is located in front of the commodity reading surface 124 (environmental light measurement image) under the control of the environmental light measurement unit 202. More specifically, the image pickup unit 132 takes an environmental light measurement image with a predetermined exposure time and generates image data representing the environmental light measurement image. Further, the image pickup unit 132 outputs the image data representing the environmental light measurement image to the environmental light measurement unit 202. Note that the environmental light measurement image may include an image of a commodity to be read.

The environmental light measurement unit 202 analyzes the environmental light measurement image and thereby calculates the brightness (illuminance) of the environmental light. Specifically, for example, the environmental light measurement unit 202 calculates the brightness (illuminance) of the environmental light based on the color tone of the environmental light measurement image taken with the predetermined exposure time. The environmental light measurement unit 202 calculates the brightness (illuminance) of the environmental light in such a manner that the closer to white the color tone of the environmental light measurement image is, the higher the brightness (illuminance) of the environmental light is. To put it the other way around, the environmental light measurement unit 202 calculates the brightness (illuminance) of the environmental light in such a manner that the closer to black the color tone of the environmental light measurement image is, the lower the brightness (illuminance) of the environmental light is.

More specifically, for example, the environmental light measurement unit 202 may calculate the degree of a color that indicates how much the color tone of the environmental light measurement image is close to white by extracting a pixel value for each pixel of the image data representing the environmental light measurement image and averaging all the pixel values. Note that the "pixel value" is described later.

Note that the environmental light measurement unit 202 stores an illuminance table that associates degrees of colors (average values of pixel values) of environmental light measurement images that are taken with a predetermined exposure time in advance with illuminances of the surrounding environment at the time when these environmental light measurement images with the degrees of colors are taken. The environmental light measurement unit 202 measures the brightness (illuminance) of environmental light from the degree of the color (an average value of pixel values) of an environmental light measurement image and the illuminance table. Further, the environmental light measurement unit 202 outputs information indicating the brightness of the environmental light (environmental-light illuminance) obtained by the measurement to the light source intensity control unit 206.

Note that the illuminance table is created, for example, as follows. That is, the illuminance of the surrounding environment is measured under various environmental light brightness conditions in advance by using an illuminance sensor or the like, and an environmental light measurement image is taken with a predetermined exposure time by using the image pickup unit 132 under each of these various conditions. Then, measurement values measured by the illuminance sensor or the like are associated with the degrees of the colors (the average value of pixel values) of the environmental light measurement images that are taken with the predetermined exposure time under the respective conditions. In this way, the illuminance table is created. Note that even when the degree of the color (the average value of pixel values) of an environmental light measurement image does not exactly match any value in the illuminance table, the illuminance of the environmental light can be calculated by interpolation.

Further, the above-described "degree of the color (the average value of pixel values)" can be calculated as follows. That is, in a case where each pixel is expressed in an RGB 3D color space, a pixel value of each pixel is extracted from the intensity (a luminance, a gray-scale value, or the like) of each of the RGB colors. In this case, the "pixel value" of each pixel may be the square root of the sum of the squares of the luminance (gray-scale (i.e., gradation) values) of the RGB of that pixel (i.e., the scalar value of the color vector in a 3D color space). When information indicating the brightness (a lightness or the like) is included in each pixel, that information can be extracted as the "pixel value" of that pixel.

The distance measurement unit 204 controls the distance sensor 134 and thereby measures a distance from the distance sensor 134 to a commodity (S104). Specifically, the distance measurement unit 204 controls the distance sensor 134 so that the distance sensor 134 takes a distance image for a commodity pointed toward the commodity reading surface 124. The distance sensor 134 takes a distance image for a commodity pointed toward the commodity reading surface 124 and thereby generates the distance image (image data representing the distance image) under the control of the distance measurement unit 204. The distance measurement unit 204 acquires the generated distance image and measures the distance to the commodity by using this distance image. That is, the distance measurement unit 204, in cooperation with the distance sensor 134, has a function as distance measurement means. Further, the distance measurement unit 204 outputs the data indicating the measured distance to the commodity to the light source intensity control unit 206.

More specifically, the distance measurement unit 204 extracts data indicating a distance to a position corresponding to each of the pixels constituting a distance image (pixel distance data). Further, the distance measurement unit 204 measures (i.e., determine) the distance to the commodity based on pixel distance data for each of these pixels. In general, when a salesclerk or the like points a commodity toward the commodity reading surface 124, the commodity is the object closest to the commodity reading surface 124. Therefore, for example, the distance measurement unit 204 may use the shortest distance, i.e., the smallest value among the values indicated by all the pixel distance data as the distance to the commodity. Further, the distance measurement unit 204 may extract pixel distance data indicating distances equal to or shorter than a predetermined threshold among all the pixel distance data and use the average value of these distances of the extracted pixel distance data as the distance to the commodity.

The light source intensity control unit 206 controls the light source unit 150 and thereby adjusts the intensity of light projected by the light source unit 150 (S106). Specifically, the light source intensity control unit 206 adjusts the intensity of light applied to a commodity so that the brightness of the commodity illuminated by the light source unit 150 becomes higher than the illuminance measured by the environmental light measurement unit 202. In other words, the light source intensity control unit 206 controls the light source unit 150 so that the light emitted from the light source unit 150 has an intensity by which the effect of the environmental light can be relatively cancelled out. With the above-described commodity, it is possible to reduce the difference of the apparent color tone (the color change) of the commodity irrespective of the environmental light.

For example, the light source intensity control unit 206 may adjust the intensity of the light emitted from the light source unit 150 so that the illuminance of a commodity irradiated with the light by the light source unit 150 becomes higher than the illuminance of the environmental light by K (lux). Alternatively, for example, the light source intensity control unit 206 may adjust the intensity of the light emitted from the light source unit 150 so that the illuminance of a commodity irradiated with the light by the light source unit 150 becomes M times as high as the illuminance of the environmental light. Note that the value M may be defined according to the specification (e.g., the dynamic range) of the image pickup unit 132.

For example, in a case where the image pickup unit 132 is a CCD image sensor and the dynamic range of the CCD image sensor is, for example, 0.1 to 10, the maximum possible difference in the brightness is about 100 times. Note that, for example, when an illuminance under environmental light is 500 lux, the available shooting range of the CCD image sensor is 500 to 50,000 lux. Therefore, in this case, when a commodity is irradiated with light having the brightness of 50,000 (500×100) lux by the light source unit 150, the effect of the environmental light is cancelled out and hence color information of the commodity itself can be taken (i.e., obtained) by the image pickup unit 132. That is, in this state, the value M is set to 100 (M=100).

Further, the light source intensity control unit 206 adjusts the intensity of light emitted from the light source unit 150 according to the distance to the commodity measured by the distance measurement unit 204. Specifically, the light source intensity control unit 206 adjusts the intensity of light emitted from the light source unit 150 so that the intensity of the light is increased when the distance from the distance sensor 134 (i.e., from the commodity reading surface 124 and the light source unit 150) to the commodity is large. Further, the light source intensity control unit 206 adjusts the intensity of light emitted from the light source unit 150 so that the intensity of the light is reduced when the distance from the distance sensor 134 (i.e., from the commodity reading surface 124 and the light source unit 150) to the commodity is small. With the above-described configuration, it is possible to irradiate the commodity with the light in such a manner that the light emitted from the light source unit 150 has an intensity by which the effect of the environmental light can be relatively cancelled out even when the distance from the commodity reading surface 124 and the light source unit 150 to the commodity is large.

In general, when light having a constant intensity is emitted from a light source to a given object, the brightness (illuminance) of the object decreases as the distance between the object and the light source increases. Further, the brightness (illuminance) of the object increases as the distance between the object and the light source decreases. Specifically, the illuminance of the object is in inverse proportion to the square of the distance from the light source. In contrast to this, in general, the light source(s) of environmental light (the sun or fluorescent lights disposed on a ceiling) is considerably far away from a commodity held in front of the commodity reading surface 124. In other words, the distance from the light source(s) of environmental light (the sun or fluorescent lights disposed on a ceiling) to a commodity is much larger than the distance from the commodity reading surface 124 to the commodity. Therefore, the illuminance of the commodity by the environmental light is roughly constant irrespective of the distance from the commodity reading surface 124 to the commodity.

Assume a situation where an illuminance under environmental light is 500 lux. The light source unit 150 emits light to a commodity so that the illuminance becomes 50,000 lux when the distance from the light source unit 150 to the commodity is L. As described above, the effect of the environmental light is canceled out in this case. Here, assume that the distance from the light source unit 150 to the commodity increases to 2L. In this case, when the light source unit 150 emits light having the same intensity as that in the original state, the illuminance of the commodity becomes 12,500 (lux) (50,000/4=12,500) since the illuminance of the object (i.e., the commodity) is in inverse proportion to the square of the distance from the light source. This illuminance 12,500 is not sufficiently large for the illuminance of 500 lux under the environmental light, i.e., is not large enough to cancel out the effect of the environmental light. Therefore, it is necessary to increase the intensity of the light emitted from the light source unit 150. Therefore, in this state, in which the distance to the commodity is 2L, the light source intensity control unit 206 controls the light source unit 150 so that the intensity of the light emitted from the light source unit 150 becomes four times (= the square of two) the intensity of the light in the original state, in which the distance to the commodity is L.

The light source intensity control unit 206 sets, for example, a distance to a commodity used as a reference distance (reference distance Ls) and an intensity Plu of light emitted from the light source unit 150 for a standard commodity size (reference light intensity) in advance. Further, the light source intensity control unit 206 calculates how much times a distance L1 from the light source unit 150 to a commodity is larger than the reference distance Ls. Then, the light source intensity control unit 206 controls the light source unit 150 so that the intensity of the light emitted from the light source unit 150 becomes equal to an intensity expressed as "(L1/Ls)^2×Plu". Note that the reference light intensity can be set as appropriate according to the brightness (illuminance) of the environmental light. That is, in the above-described illuminance table, each of environmental light illuminances (lux) (e.g., 500 lux to 750 lux) may be associated with a respective one of reference light intensities (lumen) of the light source unit 150 by which the illuminance under that environmental light can be cancelled out.

The reference light intensity Plu may be defined so that, for example, when a commodity is a 10-centimeter cube and the commodity is located 15 cm away from the light source unit 150, the illuminance of the commodity becomes 50,000 lux (an illuminance M times as high as the illuminance under the environmental light). In this state, the illuminating angle of the light source unit 150 needs to be about 35 degrees. Therefore, the reference light intensity Plu in this state is about 350 lumen.

Note that the distance to the commodity at the time when the reference light intensity Plu is defined can be set as appropriate according to the position of the light source unit 150. When the light source unit 150 is disposed near the commodity reading surface 124, the reference light intensity Plu may be defined so that the illuminance of a commodity becomes 50,000 lux in a state where the commodity is disposed closer to the light source unit 150 than that in the above-described state (i.e., the commodity is located 5 cm away from the light source unit 150.)

The commodity image shooting control unit 222 controls the image pickup unit 132 so that the image pickup unit 132 takes a 2D image including an image of the commodity (commodity image) irradiated with light by the light source unit 150 (S108). Specifically, the commodity image shooting control unit 222 controls the image pickup unit 132 so that the image pickup unit 132 shoots the commodity that is pointed toward the commodity reading surface 124 and irradiated with the light by the light source unit 150. Then, the commodity image shooting control unit 222 acquires the 2D image generated by the image pickup unit 132 and outputs the acquired 2D image to the commodity recognition process unit 228. Note that this 2D image can include an image of the background (background image) in addition to the commodity image.

The commodity recognition process unit 228 performs a process for recognizing the commodity by using the 2D image acquired by the commodity image shooting control unit 222 (S110). Further, the commodity recognition process unit 228 stores commodity information obtained by the commodity recognition process in the commodity information storage unit 230. The commodity information includes information included in a barcode attached to the commodity. Further, the commodity information may include the size (capacity) of the commodity. The POS terminal device 100 performs a settlement process (or a payment process) and the like of the commodity by using the commodity information obtained by the commodity recognition process performed by the commodity recognition process unit 228.

Regarding the commodity recognition process, specifically speaking, for example, the commodity recognition process unit 228 associates names of commodities with information about those commodities (reference commodity information) and stores them in advance. The commodity recognition process unit 228 performs pattern matching between a commodity image in the 2D image and the pre-stored reference commodity information. For example, the commodity recognition process unit 228 extracts a commodity image from the 2D image and performs pattern matching between the extracted commodity image and the reference commodity information. Note that there are various methods for extracting a commodity image. For example, a background image may be taken in advance and a difference between the background image and a 2D image (including a commodity image) taken by the image pickup unit 132 may be extracted as a commodity image. Further, by using the distance sensor 134, an image area corresponding to a place in a 2D image whose distance from the distance sensor 134 is equal to or shorter than a predetermined distance may be extracted as a commodity image. Note that examples of the reference commodity information are shown hereinafter.

For example, the reference commodity information may be an image that is used as a reference image of a commodity (reference commodity image). In this case, the commodity recognition process unit 228 compares the extracted commodity image with the reference commodity image. Further, when the similarity between them meets a permissible value, the commodity recognition process unit 228 associates the commodity with the name of a commodity corresponding to the reference commodity image.

Further, for example, the reference commodity information may be data representing a reference feature(s) of a commodity (commodity feature data). For example, the commodity feature data may include at least one of information indicating the shape of the commodity, information indicating the color of the commodity, information indicating the texture (such as a luster) of the commodity, and information indicating text information and a pattern attached to the package of the commodity. In this case, the commodity recognition process unit 228 extracts a feature(s) of the extracted commodity image from the extracted commodity image. Then, the commodity recognition process unit 228 compares the extracted feature of the image with the commodity feature data. Then, when the similarity between them meets a permissible value, the commodity recognition process unit 228 associates the commodity with the name of a commodity corresponding to the commodity feature data. Further, the commodity recognition process unit 228 may recognize the name of a commodity by reading text information attached to the package of the commodity by using an OCR (Optical Character Reader).

Note that as described above, when a process for recognizing a commodity is performed by using an image recognition technique, color information of the commodity is an important element for the commodity recognition process. In particular, commodities such as fruits and vegetables are distinguished based on their color differences. Therefore, if the color information of such commodities is not appropriately used, it could cause erroneous recognition. However, there are cases where the color of a commodity is changed and the commodity is shot with the changed color due to light from the surrounding environment (environmental light) at the time when the commodity is shot by a camera.

Meanwhile, this exemplary embodiment is configured so that when the image pickup unit 132 shoots a commodity, the light source unit 150 irradiates the commodity with light while adjusting the intensity of the light emitted from the light source unit 150 so that the effect of the environmental light can be cancelled out. In this way, it is possible to prevent or reduce the change in the color of the commodity due to the environmental light when the image pickup unit 132 shoots the commodity. For example, in an environment where evening sunlight comes into the periphery of the POS terminal device 100, the light source unit 150 irradiates a commodity with light while adjusting the intensity of the light so that the change in the color of the commodity due to the evening sun (i.e., reddish change) is eliminated (or cancelled out) and the commodity is shot with its natural color. Therefore, in this exemplary embodiment, it is possible to use color information that is closer to the correct color information of the commodity for the process for recognizing the commodity. Accordingly, it is possible to prevent or reduce the erroneous recognition of commodities and thereby improve the commodity recognition rate.

Further, in the first exemplary embodiment, the light source unit 150 emits light from the inside of the commodity reading device 120 toward the commodity reading surface 124. As a result, light is emitted from the commodity reading surface 124 when a salesclerk or the like points a commodity toward the commodity reading surface 124. Therefore, the salesclerk or the like can easily find the place where the salesclerk or the like should hold a commodity over the commodity reading surface 124.

(Second Exemplary Embodiment)

Next, a second exemplary embodiment is explained. The second exemplary embodiment differs from the first exemplary embodiment in that the second exemplary embodiment includes diffusion means for diffusing light emitted by the light source unit 150. Note that the configuration of the POS terminal device 100 according to the second exemplary embodiment is similar to that according to the first exemplary embodiment except for the provision of the diffusion means, and therefore its explanation is omitted.

Figure 6:
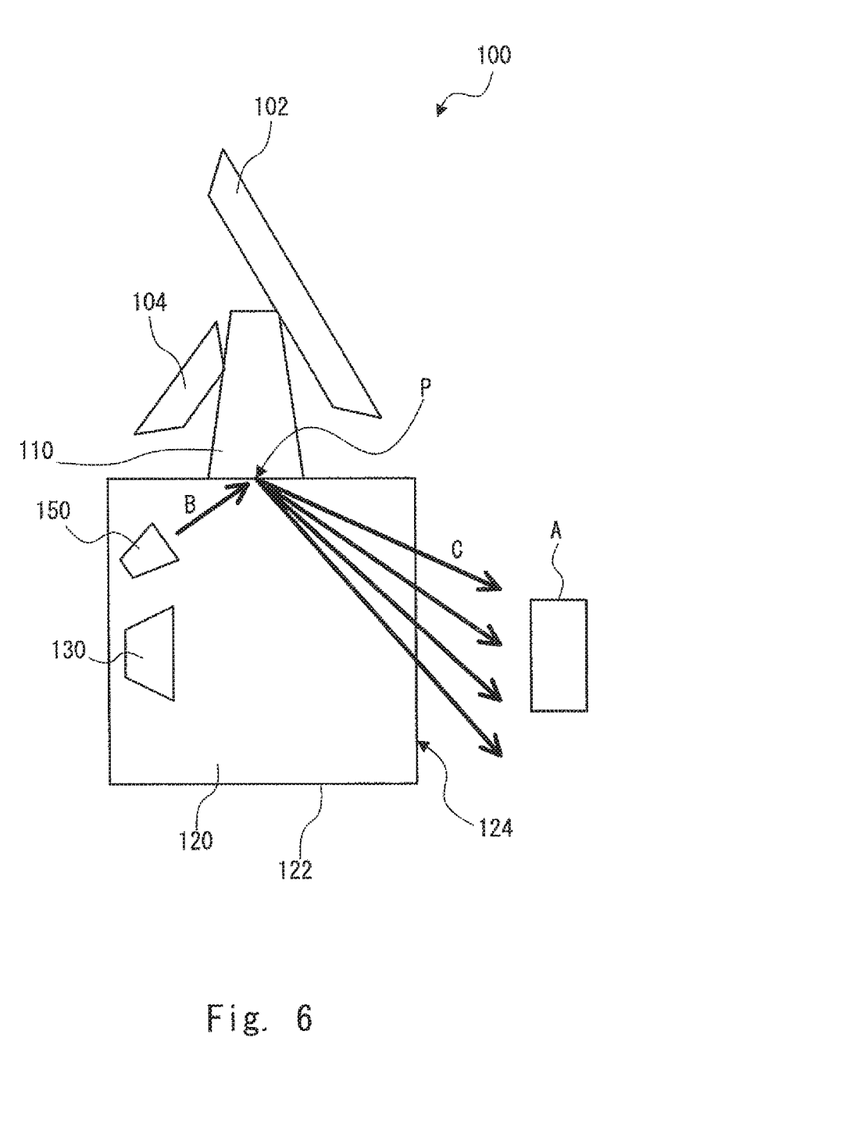
FIG. 6 shows an example of a POS terminal device according to a second exemplary embodiment.

FIG. 6 shows an example of a POS terminal device 100 according to the second exemplary embodiment. In the first exemplary embodiment, the light source unit 150 emits light toward the commodity reading surface 124. In contrast to this, in the POS terminal device 100 according to the second exemplary embodiment shown in FIG. 6, the light source unit 150 emits light toward one of the surfaces of the housing 122 as indicated by an arrow B. The light emitted by the light source unit 150 reflects at a point P on the surface of the housing. Then, the reflected light is diffused as indicated by arrows C and is emitted (i.e., propagates) toward the commodity reading surface 124. This diffused reflected light is applied to a commodity A that is pointed toward the commodity reading surface 124.

In direct illumination in which light is directly applied from a light source to an object, the illuminance on the illuminated surface of the object is likely to become non-uniform. In this state, a part of the illuminated surface of the object becomes white like spotlight. Therefore, there is a possibility that when the image pickup unit 132 shoots the commodity in this state, the color information of that white part differs from the actual color information of the commodity. In contrast to this, in indirect illumination in which light projected from a light source is diffused by reflecting it on a wall surface or the like and an object is irradiated with the diffused reflected light, the illuminance on the illuminated surface of the object is likely to become uniform.

Therefore, by diffusing the light projected by the light source unit 150 by reflecting it on the surface of the housing as described above, it is possible to irradiate the surface of a commodity that is opposed to the commodity reading surface 124 with the light in a more uniform state. Consequently, in the second exemplary embodiment, it is possible to use color information that is closer to the correct color information of the commodity for the process for recognizing the commodity. Accordingly, it is possible to prevent or reduce the erroneous recognition of commodities even further and thereby improve the commodity recognition rate even further.

Figure 7:
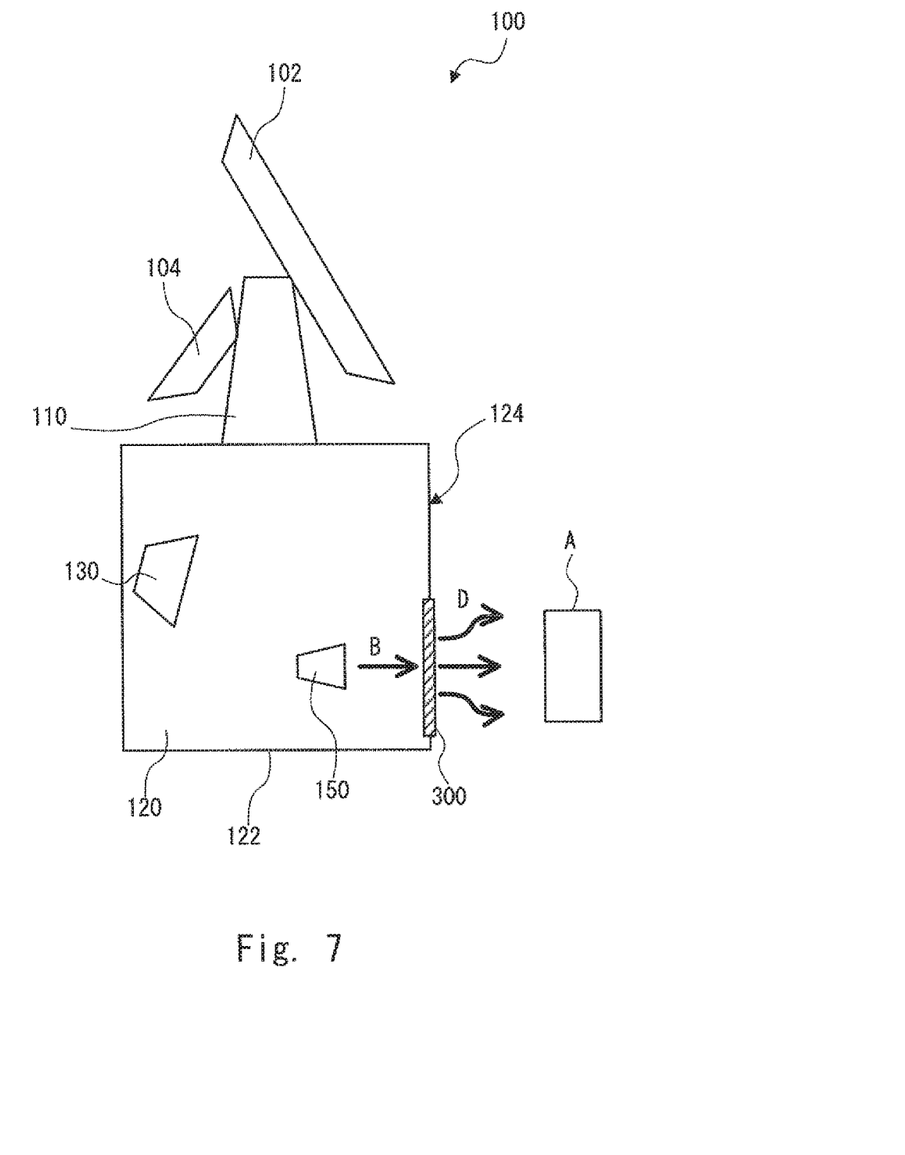
FIG. 7 shows another example of a POS terminal device according to the second exemplary embodiment.

FIG. 7 shows another example of a POS terminal device 100 according to the second exemplary embodiment. In FIG. 7, the POS terminal device 100 includes a diffusion member 300 as diffusion means. The diffusion member 300 is disposed on at least a part of the commodity reading surface 124. The diffusion member 300 is formed of material, such as plastic or a diffuser film, that can diffuse light when the light passes therethrough. Light projected by the light source unit 150 is diffused through the diffusion member 300 and applied to a commodity A. In this way, it is possible to irradiate the surface of the commodity that is opposed to the commodity reading surface 124 with the light in a more uniform state.

Note that FIG. 6 shows an example in which the POS terminal device 100 includes (i.e., uses), as the diffusion means, a surface of the housing 122 that is irradiated with light projected by the light source unit 150 in order to diffuse the light by reflecting it on the surface. Further, FIG. 7 shows an example in which the POS terminal device 100 includes, as the diffusion means, the diffusion member 300 in order to diffuse light projected by the light source unit 150. However, the diffusion means is not limited to these examples. For example, the emitting angle of the light emitted from the light source unit 150 may be widened so that the light is diffused. Further, for example, a plurality of LEDs may be arranged in a grid pattern so that the light is diffused.

Further, in the example shown in FIG. 6, the light source unit 150 emits light toward the upper surface of the housing 122. However, the direction of the light is not limited to this example. For example, the light source unit 150 may emit light toward a side surface of the housing 122. Further, in the example shown in FIG. 7, the diffusion member 300 is disposed on the commodity reading surface 124. However, the position of the diffusion member 300 is not limited to this example. For example, the diffusion member 300 may be disposed between the light source unit 150 and the commodity reading surface 124.

(Modified Example)

Note that the present invention is not limited to the aforementioned exemplary embodiments and may be changed as appropriate without departing from the spirit of the present invention. For example, the order of processes in the above-described flowchart can be changed as appropriate. Further, at least one of a plurality of processes in the above-described flowchart may be omitted. For example, the process in the step S104 in the flowchart shown in FIG. 5 may be omitted. Further, although only one light source unit 150 is provided in the above-described exemplary embodiment, the number of light sources 150 may be two or more.

Further, for example, although the configuration according to this exemplary embodiment is applied to a POS terminal device, the entity to which the present invention applied is not limited to the POS terminal device. For example, the present invention can be applied to general object recognition apparatuses such as those used to sorting out baggage in warehouse or the like, and applied to systems including such object recognition apparatus. Further, the POS terminal device 100 according to this exemplary embodiment can be applied to, for example, self-checkout counters. Further, the POS terminal device 100 according to this exemplary embodiment can be applied to terminals such as tablet terminals (tablet POSs) as described above.

Further, in the above-described first exemplary embodiment, the image pickup unit 132 is used as an example of the brightness measurement means and a brightness (an illuminance) is measured (i.e., determined) by analyzing pixels of an image taken by the image pickup unit 132. However, the brightness measurement means is not limited to this example. For example, an illuminance sensor may be used as the brightness measurement means and a brightness (an illuminance) by environmental light may be measured by the illuminance sensor. Further, this illuminance censor may be disposed outside the POS terminal device. In such a case, the POS terminal device may receive illuminance data from the illuminance sensor and adjust the intensity of light emitted from the light source based on the received illuminance data by using the above-described method. On the other hand, by measuring the illuminance by using the image pickup unit 132, there is no need to separately provide an illuminance sensor.

Further, in the above-described exemplary embodiment, the intensity of light emitted by the light source unit 150 is controlled according to the distance to the commodity. However, the control does not necessarily have to be performed according to the distance. In such a case, the image pickup means for taking an image of a commodity does not necessarily have to be a 3D camera. On the other hand, by changing the intensity of light emitted by the light source unit 150 according to the distance, the illuminance of a commodity can be made more uniform irrespective of the distance to the commodity.

Further, in this exemplary embodiment, the distance to a commodity is measured by using the distance sensor 134 as the distance measurement means and the intensity of light emitted by the light source unit 150 is controlled according to the measured distance to the commodity. However, the present invention is not limited to this configuration. For example, means by which a salesclerk or the like enters a distance from a commodity to the commodity reading surface 124 is provided as the distance measurement means and the intensity of light emitted by the light source unit 150 is controlled according to the entered distance.

Further, in the above-described exemplary embodiment, the POS terminal device 100 performs a process for recognizing a commodity. However, the present invention is not limited to this configuration. For example, a management device such as a server, which is connected to the POS terminal device 100 so that communication can be performed therebetween, may perform the process for recognizing a commodity. Further, although the light source control unit 200 controls the intensity of light emitted by the light source, the present invention is not limited to this configuration. The light source control unit 200 may control the light source unit 150 so that the direction of the light source unit 150 is changed according to the position of a commodity. Further, the light source control unit 200 may perform control so that the light source unit 150 is moved closer to the commodity reading surface 124 when the distance to the commodity is large, and the light source unit 150 is moved away from the commodity reading surface 124 when the distance to the commodity is small. In this way, the illuminance of the commodity can be made more uniform irrespective of the distance from the commodity reading surface 124 to the commodity.

Further, this program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent applications No. 2013-233132, filed on Nov. 11, 2013, the disclosure of which is incorporated herein in its entirety by reference.

REFERENCE SIGNS LIST

1 POS TERMINAL DEVICE
2 BRIGHTNESS MEASUREMENT UNIT
4 IRRADIATION UNIT
6 IMAGE-PICKUP UNIT
8 RECOGNITION PROCESS UNIT
100 POS TERMINAL DEVICE
110 INFORMATION PROCESSING DEVICE
120 COMMODITY READING DEVICE
122 HOUSING
124 COMMODITY READING SURFACE
130 3D CAMERA
132 IMAGE PICKUP UNIT
134 DISTANCE SENSOR
136 INFRARED-LIGHT EMITTING UNIT
138 INFRARED-LIGHT RECEIVING UNIT
140 DISTANCE IMAGE GENERATION UNIT
150 LIGHT SOURCE
200 LIGHT SOURCE CONTROL UNIT
202 ENVIRONMENTAL LIGHT MEASUREMENT UNIT
204 DISTANCE MEASUREMENT UNIT
206 LIGHT SOURCE INTENSITY CONTROL UNIT
220 RECOGNITION PROCESS UNIT
222 COMMODITY IMAGE SHOOTING CONTROL UNIT
228 COMMODITY RECOGNITION PROCESS UNIT
230 COMMODITY INFORMATION STORAGE UNIT
300 DIFFUSION MEMBER

The invention claimed is:

1. A POS terminal device comprising:
a light source configured to irradiate a commodity with light,
a brightness measurement hardware component that measures brightness of environmental light from an environment surrounding the commodity and a camera,
the camera configured to generate an image of the commodity irradiated with the light by the light source,
at least one memory storing instructions, and
at least one processor configured to execute the instructions to:
adjust an intensity of light applied to the commodity so that the brightness of the commodity irradiated by the light source becomes higher than the measured brightness of the environmental light;
recognize the commodity by comparing the generated image of the commodity, the commodity being irradiated with the light according to the adjusted light intensity, with a pre-stored reference commodity information; and
determine, based on the comparison, whether the generated image is similar to the reference commodity information.

2. The POS terminal device according to claim 1, wherein the brightness measurement hardware component is configured to measure the brightness of the environmental light based on a brightness of light received by the camera when the light source does not emit light.

3. The POS terminal device according to claim 1, wherein the at least one processor is further configured to execute the instructions to measure a distance to the commodity; and
adjust an intensity of light applied to the commodity according to the measured distance.

4. The POS terminal device according to claim 1, further comprising a diffusion member for diffusing light emitted by the light source, wherein
the diffused light is applied to the commodity.

5. The POS terminal device according to claim 4, wherein the light source emits light to a surface of a housing and light reflected on the surface of the housing is applied to the commodity, the light source being disposed in the housing.

6. The POS terminal device according to claim 4, wherein the diffusion member is formed of material that diffuses light as the light passes therethrough.

7. A method for recognizing a commodity comprising:
measuring a brightness of environmental light from an environment surrounding the commodity and a camera;
irradiating a commodity with light;
adjusting an intensity of light applied to the commodity so that the brightness of the commodity by the light applied to the commodity becomes higher than the brightness of the measured environmental light;
generating an image of the commodity irradiated with the light by the light source;
recognizing the commodity by comparing the generated image of the commodity, the commodity being irradiated with the light according to the adjusted light intensity, with a pre-stored reference commodity information; and
determining, based on the comparison, whether the generated image is similar to the reference commodity information.

8. The method for recognizing a commodity according to claim 7, wherein the brightness of the environmental light is measured based on a brightness of light received by a camera when the light is not emitted, the camera being configured to shoot the commodity.

9. The method for recognizing a commodity according to claim 7, further comprising:
measuring a distance to the commodity; and
adjusting an intensity of the light applied to the commodity according to the measured distance.

10. The method for recognizing a commodity according to claim 7, further comprising diffusing the light applied to the commodity.

11. A non-transitory computer readable medium including a processor for causing a computer to execute operations comprising:
measuring a brightness of environmental light from an environment surrounding the commodity and a camera;
adjusting an intensity of light applied to a commodity so that the brightness of the commodity by the light applied to the commodity becomes higher than the brightness of the measured environmental light;
generating an image of the commodity irradiated with the light by the light source;
recognizing the commodity by comparing the generated image of the commodity, the commodity being irradiated with the light according to the adjusted light intensity, with a pre-stored reference commodity information; and determining, based on the comparison, whether the generated image is similar to the reference commodity information.

12. The non-transitory computer readable medium according to claim 11, wherein measuring the brightness of the environmental light comprises measuring the brightness of the environmental light based on a brightness of light received by a camera when the light is not emitted, the camera configured to shoot the commodity.

13. The non-transitory computer readable medium according to claim 11, wherein the program further causes the computer to execute operations comprising:

measuring a distance to the commodity; and adjusting an intensity of the light applied to the commodity according to the measured distance.

* * * * *